United States Patent [19]

Peters

[11] Patent Number: 4,687,752

[45] Date of Patent: Aug. 18, 1987

[54] MEDIUM WEIGHT ABRASION-RESISTANT CASTABLE

[75] Inventor: Dennis D. Peters, King of Prussia, Pa.

[73] Assignee: Resco Products, Inc., Norristown, Pa.

[21] Appl. No.: 622,922

[22] Filed: Jun. 21, 1984

[51] Int. Cl.$^4$ .................... C04B 35/44; C04B 35/02
[52] U.S. Cl. ................... 501/121; 501/124; 501/119; 501/128; 501/155; 106/104
[58] Field of Search ............ 501/124, 118, 119, 128, 501/121, 133, 155; 106/DIG. 1, 104

[56] References Cited

U.S. PATENT DOCUMENTS

| | | | |
|---|---|---|---|
| 2,880,098 | 3/1959 | Jones | 501/129 |
| 3,181,959 | 5/1965 | Raine et al. | 106/104 |
| 3,790,394 | 2/1974 | Magnan | 106/104 |
| 4,149,899 | 4/1979 | Crookston | 501/128 |

FOREIGN PATENT DOCUMENTS

| | | | |
|---|---|---|---|
| 743153 | 9/1966 | Canada | 501/124 |
| 4509 | 10/1979 | European Pat. Off. | 501/87 |
| 6129679 | 10/1981 | Japan | 106/104 |
| 1095751 | 12/1967 | United Kingdom | 501/124 |

OTHER PUBLICATIONS

Harbison-Walker Refractory Co., *Modern Refractory Practice*, pp. 44, 154–155, 163–167, 1961.
Towa Castables–Interoffice Correspondence.

*Primary Examiner*—William R. Dixon, Jr.
*Assistant Examiner*—A. Knab
*Attorney, Agent, or Firm*—Seidel, Gonda, Goldhammer & Abbott

[57] ABSTRACT

A medium weight abrasion-resistant castable for use as a refractory lining having a bulk density of no greater than 130 lbs/cu ft, and abrasion loss of no greater than about 25 cc and a thermal conductivity of no greater than 5.5 BTU/hr/ft$^2$/in/°F. includes a coarse aggregate of cordierite. The composition also includes an intermediate sized aggregate of calcined kaolin or calcined flint and a finer sized aggregate of calcined kaolin or calcined flint, fly ash cenospheres, clay, fume silica, and cement.

21 Claims, No Drawings

MEDIUM WEIGHT ABRASION-RESISTANT CASTABLE

BACKGROUND OF THE INVENTION

1. Field of the Invention

This invention relates generally to refractory linings and more particularly concerns a medium weight abrasion-resistant castable which may be used as a refractory lining.

2. Prior Art

Oil refineries use a significant amount of refractory linings comprising a dual castable lining having a dense abrasion-resistant working face and an insulating back-up. The dual castable is formed from two separate bodies which are held together by the anchoring system when the steel shell is lined. The insulating material is initially applied to the steel shell and then the dense abrasion-resistant material is applied to form the working face of the lining.

The dense abrasion-resistant face extends the life of the lining, but since its thermal conductivity is not sufficiently low, there must be an insulating layer behind the working face. Although such a refractory lining is adequate, since two layers must be installed, the time required to line the steel shell is significantly greater than if a single layer of castable material were used.

As an alternative, the prior art has used a single dense abrasion-resistant lining. However, to obtain adequate abrasion resistance, the refractory linings of the prior art have had to sacrifice the insulating value of the lining due to a higher thermal conductivity of the abrasion-resistant hard aggregate material used. Further, the density of the material makes it more difficult to hold the lining against the steel shell.

According to ASTM, C-401 on Classification of Castable Refractories, an "Insulating Castable" does not exceed a maximum bulk density of 105 lbs/cu ft. Commonly used abrasion-resistant products generally referred to as dense castables have a density which is generally greater than 130 lbs/cu ft after being dried at 220° F. The term "medium weight" is used to describe a castable having a density of between 105 and 130 lbs/cu ft.

OBJECT OF THE INVENTION

The principle object of the present invention is to provide a medium weight abrasion-resistant castable for use as a refractory lining.

A further object is to provide such a castable having a bulk density of less than 120 lbs/cu ft, and abrasion loss of less than 20 cc and a thermal conductivity of less than 5.5 BTU/hr/ft$^2$/in/°F.

Other objects and advantages will appear hereinafter.

SUMMARY OF THE INVENTION

The objects are accomplished by providing a castable in which the coarse aggregate has been substituted with a raw material which may not be as hard as the currently used aggregate but has a better insulating value to decrease the thermal conductivity of the castable without an increase in abrasion loss. Such a material is cordierite which is a synthetic mineral found in saggers for setting whiteware during firing.

Another important factor to achieve the desired castable is the proper selection of grain size distribution of the aggregate used to form the castable. Strength and abrasion resistance is maximized by using a gap sized grain distribution.

DETAILED DESCRIPTION

A desirable medium weight abrasion-resistant castable has the following properties:

| | |
|---|---|
| Bulk Density (220° F.) | 105–130 lbs/cu ft |
| CCS (1500° F.) | >3000 PSI |
| MOR (1500° F.) | >700 PSI |
| Allowable Linear Change (1500° F.) | 0.5% (max. expansion) to −0.5% (max. shrinkage) |
| Abrasion Loss (1500° F.) | <25 cc |
| Thermal Conductivity (1000° F. mean) | <5.5 BTU/hr/ft$^2$/in/°F. |

Bulk density (220° F.) is measured after the material has been dried at 220° F. CCS (1500° F.) is cold crushing strength which is the strength of the castable when placed in compression after having been fired to 1500° F. and cooled to room temperature. MOR (1500° F.) is modulus of rupture which is the strength of the castable when placed in flexure using a three-point bend test after being fired to 1500° F. Linear change (1500° F.) is the percent change in length of a rectangular shaped specimen having an initial length recorded after being dried at 220° F. and the final length recorded after the same specimen has been fired to 1500° F. and cooled to room temperature. An allowable linear change of −0.5% means that the maximum allowable shrinkage is 0.5%. Abrasion resistance, also known as erosion loss, is measured in accordance with ASTM C-704 Abrasion Resistance of Refractory Materials at Room Temperature.

The property requirements established for a dense weight abrasion-resistant castable are as follows:

| | |
|---|---|
| Bulk Density (220° F.) | 120–140 lbs/cu ft |
| CCS (1500° F.) | >5000 PSI |
| MOR (1500° F.) | >1400 PSI |
| Allowable Linear Change (1500° F.) | −0.3% (max. shrinkage) |
| Abrasion Loss (1500° F.) | <14 cc. |
| Thermal Conductivity (1000° F. mean) | <7.5 BTU/hr/ft$^2$/in/°F. |

Note that the lowest thermal conductivity the prior art had been able to obtain for a dense weight castable was 7.0 BTU/hr/ft$^2$/in/°F. which is significantly higher than for the present medium weight castable.

The demand for a medium weight abrasion-resistant castable has developed and is increasing. One major user of castables, Exxon, has challenged the industry to meet the below-identified requirements for a medium weight abrasion-resistant castable but the industry failed to discover a product which would meet the criteria:

| | |
|---|---|
| Bulk Density (220° F.) | <120 lbs/cu ft |
| CCS (1500° F.) | <3000 PSI |
| MOR (1500° F.) | >700 PSI |
| Allowable Linear Change (1500° F.) | −0.3% (max. shrinkage) |
| Abrasion Loss (1500° F.) | <20 cc |
| Thermal Conductivity (1000° F. mean) | <5.5 BTU/hr/ft$^2$/in/°F. |

Therefore Exxon changed the upper limit for the thermal conductivity to 6.5 BTU/hr/ft$^2$/in/°F.

The best the prior art has been able to obtain in the laboratory is a medium weight castable having the following properties:

| | |
|---|---|
| Bulk Density (220°) | 117 lbs/cu ft |
| Abrasion Loss (1500° F.) | 16-19 cc |
| Thermal Conductivity (1000° mean) | 5.9 BTU/hr/ft$^2$/in/°F. |

Other conventional castables have been produced having a density of 122 to 123 lbs/cu ft, abrasion loss 11 to 14 cc and thermal conductivity of 6.2 BTU/hr/ft$^2$/°F.

Conventional castables comprise aggregate of calcined flint or calcined kaolin. These materials have good thermal conductivity and abrasion resistance. However, the density of the calcined flint and calcined kaolin causes the bulk density of the standard castable to be greater than about 120 lbs/cu ft.

Upon investigation of the abrasion test plates for the dense abrasion-resistant product following the ASTM C-704 testing, it was noted that the coarse aggregate of calcined flint or calcined kaolin protruded in the wear area. Therefore, it was concluded that the matrix of intermediate grains and cement was abrading at a faster rate than the coarse aggregate. By replacing the coarse aggregate with a material that may not be as hard as the calcined flint or calcined kaolin, the abrasion wear between the coarse aggregate and matrix would be more even and therefore the abrasion loss would be similar to the dense abrasion-resistant product. If a new coarse aggregate were chosen which had a better insulating value and a comparable, but lower, hardness, the castable would wear as well as the dense product but with a decrease in thermal conductivity.

Cordierite, having a specific gravity of 2.57–2.66 g/cc and a hardness of 7.0–7.5 Mohs in natural occurence is such as material. Although cordierite is scarce in natural occurrence, synthetic cordierite is found in saggers used to set whiteware during firing. The saggers were found to contain cordierite and mullite as major phases with quartz as a minor phase. It is the cordierite in the saggers that result in reduced thermal conductivity without significantly increasing abrasion loss.

After the saggers begin to crack excessively, they are discarded and used as land fill. Therefore, not only do the saggers containing cordierite have the desired properties, but it is an inexpensive raw material. Other synthetic bodies containing cordierite may also be used in this product.

To form the coarse aggregate of cordierite, the saggers must be crushed and sized by passing through a screen of proper mesh.

The composition range and preferred composition for a medium weight abrasion-resistant castable having the desired properties is listed below:

| Composition | Preferred Composition (Percent By Weight) | Composition Range (Percent By Weight) |
|---|---|---|
| Cordierite, 6 × 20 M | 38 | 30–50 |
| Calcined Kaolin, 20 M | 16.5 | 8–21 |
| Calcined Kaolin, 100 M | 10 | 6–13 |
| Fly Ash Cenospheres | 3 | 0–6 |
| Clay Air floated | 1 | 0–5 |
| Fume Silica | 1.5 | 0–5 |
| Binder | 30 | 20–35 |

While the term 6×20M means a grain size which will pass through a Tyler standard screen having a mesh designation of 6 mesh and not pass through a 20 mesh, the cordierite supplied and used in the composition is approximately 95% 6×20M with the remainder being an aggregate of a smaller size. A typical grain size distribution is as follows:

| Cordierite, 6 × 20 M | |
|---|---|
| Tyler Mesh | Weight % Retained |
| +4 | 0.0 |
| −4 +6 | 4.9 |
| −6 +8 | 43.8 |
| −8 +10 | 25.3 |
| −10 +14 | 15.8 |
| −14 +20 | 6.0 |
| −20 | 4.2 |

Tyler Mesh +4 means a grain size greater than Tyler Mesh 4, i.e. greater than 0.185 in. Tyler Mesh −4+6 means a grain size less than Tyler Mesh 4 and greater than Tyler Mesh 6.

The use of calcined kaolin, also known as calcined clay, is necessary to achieve the required hardness in the matrix for abrasion resistance. The use of cordierite having a size of 20 mesh or less does not achieve the necessary abrasion resistance due to the lower hardness value of cordierite and because cordierite has a higher water absorption which requires more water to form the castable and therefore creates more porosity. Other known refractory materials such as calcined flint or fused silica may be used in place of the calcined kaolin.

It is important to use two different sized fractions of the calcined kaolin. By forming the castable with an intermediate grain size of 20 mesh and smaller of calcined kaolin and a finer sized grain of calcined kaolin of 100 mesh or less, the most ideal grain packing is promoted. The calcined kaolin aggregate fills the gaps between the coarse aggregate of cordierite. This results in a maximization of strength and abrasion resistance.

The calcined kaolin may be obtained from C-E Minerals under the tradename Mulcoa 47. Mulcoa 47, 20 mesh and Mulcoa 47, 100 mesh have the following grain size distributions:

| Mulcoa 47, 20 M | |
|---|---|
| Tyler Mesh | Wt % Retained |
| +20 | Trace-3 |
| −20 +28 | 8–19 |
| −28 +35 | 19–31 |
| −35 +60 | 21–35 |
| −60 +100 | 10–22 |
| −100 | 8–24 |

| Mulcoa 47, 100 M | |
|---|---|
| Tyler Mesh | Wt % Retained |
| +35 | Trace |
| −35 +200 | 35–45 |
| −200 | 55–65 |

If less than the preferred amount of cordierite is used and is replaced with coarse aggregate of kaolin, the density of the castable would be increased. This increase may be offset by using a greater amount of fly ash cenospheres.

A smaller grain size cordierite may be used. However the use of intermediate and finer grain size cordierite results in a softer, more porous matrix.

The fly ash cenospheres are hard, lightweight intermediate grains having a bulk density of 24 lbs/cu ft and a particle size of approximately 48–400 mesh. The use of the fly ash is necessary to reduce the bulk density of the castable. The cenospheres also improve the plasticity of the mix. Use of the fly ash does reduce the abrasion resistance, but is necessary to reduce the bulk density and maintain a low thermal conductivity.

The fly ash cenospheres may be attained from Fillite U.S.A., Inc. under the tradename Fillite 52/7/S. Other aggregate having similar hard, lightweight intermediate grains may be substituted for the fly ash cenospheres.

The clay and fume silica are added to the composition to give a wide water range and add plasticity to the mix for better placement. The air floated clay is a reduced size fine clay. Ultrafine fume silica has a size of less than 50 microns and preferably less than 1 micron. Plasticizers may be used in place of the air floated clay. These fine particles fill the smaller pores in the mix thereby improving mechanical packing and abrasion resistance. The fine particles may be a combination of air floated clay and ultrafine or either air floated clay or ultrafine alone. The air floated clay may be obtained from Kentucky-Tennessee Clay Company under the tradename KT #6 and the fume silica from Interlake, Inc. under the tradename Globe Fume.

The binder may be a high purity calcium aluminate cement or other known cement. High purity calcium aluminate cement may be obtained from Lone Star LaFarge under the tradename Secar 80 or from Alcoa under the tradename CA-25.

The typical properties of the medium weight abrasion resistant castable having the preferred composition are as follows:

| Typical Properties | |
| --- | --- |
| Bulk Density (220° F.) | 116 to 120 lbs/cu ft |
| CCS (1500° F.) | 5500 to 7700 PSI |
| MOR (1500° F.) | 800 to 1000 PSI |
| Linear Change (1500° F.) | 0.0 to −0.3% |
| Abrasion loss (1500° F.) | 16 to 20 cc |
| Thermal Conductivity (1000° F. mean) | 4.5 to 5.5 BTU/hr/ft$^2$/in/° F. |

Therefore, the castable meets the requirements which have been set and are in demand by the industry.

The present invention may be embodied in other specific forms without departing from the spirit or essential attributes thereof and, accordingly, reference should be made to the appended claims, rather than to the foregoing specification, as indicating the scope of the invention.

By "synthetic cordierite containing material" as used in the claims is meant the cordierite found with mullite as major phases, with quartz as a minor phase, in saggers used to set whiteware during firing.

I claim:

1. A medium weight castable for use as a refractory lining characterized by a synthetic cordierite containing material having a grain size of 6×20 Tyler mesh an amount from about 30% to about 50% by weight; calcined kaolin, calcined flint or fused silica having a grain size of less than Tyler 20 in an amount from about 14% to about 34% by weight; fly ash cenospheres in an amount up to about 6% by weight; air floated clay in an amount up to about 5% by weight; fume silica ultrafine in an amount up to about 5% by weight; and a binder in an amount from about 20% to about 35% by weight.

2. The castable according to claim 1 further characterized by the castable having a bulk density of between about 105 lbs/cu ft (about 1.7 gr/cc) and about 130 lbs/cu ft (about 2.1 gr/cc) after being dried at about 220° F. (about 104° C.), an abrasion loss of no greater than about 25 cc after being fired at about 1500° F. (about 815° C.) and a thermal conductivity of between about 4.5 and about 6.5 BTU/hr/ft$^2$/in/°F. (about 3.1 and about 4.5 Kcal/min/cm$^2$/cm/°C.) at a mean temperature of about 1000° F. (about 538° C.).

3. The castable according to claim 2 further characterized by the thermal conductivity being between about 4.5 and about 6.0 BTU/hu/ft$^2$/in/°F. (about 3.1 and about 4.15 Kcal/min/cm$^2$/cm/°C.).

4. The castable according to claim 2 further characterized by the thermal conductivity being between about 4.5 and about 5.5 BTU/hr/ft$^2$/in/°F. (about 3.1 and about 3.8 Kcal/min/cm$^2$/cm/°C.).

5. The castable according to claim 2 further characterized by the abrasion loss being less than about 13 cc.

6. The castable according to claim 2 further characterized by the abrasion loss being less than about 10 cc.

7. The castable according to claim 1 further characterized by the binder being a high purity calcium aluminate cement.

8. The castable according to claim 1 further characterized by the cordierite containing material being in an amount of about 38% by weight, the calcined kaolin, calcined flint or fused silica being in an amount of about 26.5% by weight, the fly ash cenospheres being in an amount of about 3% by weight, the clay being in an amount of about 1% by weight, the fume silica being in an amount of about 1.5% by weight and the binder being high purity calcium aluminate cement in an amount of about 30% by weight.

9. A medium weight castable composition to be used as a refractory where abrasive wear is encountered comprising a solids blend on a weight percentage basis of:
    about 30 to 50% of a synthetic cordierite containing material having a grain size of about 6×20 Tyler mesh;
    about 14 to 34% of a material having both a higher thermal conductivity and hardness than the synthetic cordierite containing material and having a grain size of less than 20 Tyler mesh; and
    about 20 to 35% of a cement binder.

10. The composition according to claim 9 in which the relatively fine grained material is selected from the group consisting of calcined kaolin, calcined flint, fused silica, or a combination thereof.

11. The composition according to claim 10 in which the relatively fine grained material contains two different sized fractions.

12. The composition of claim 9 wherein the cement binder is a calcium aluminate cement.

13. The composition according to claim 9 further comprising on a weight percentage basis about up to 6% of fly ash cenospheres.

14. The composition according to claim 13 wherein said fly ash cenospheres have a grain size of about 48-400 Tyler mesh.

15. The composition according to claim 9 further comprising on a weight percentage basis up to 5% of air floated clay.

16. The composition according to claim 9 further comprising on a weight percentage basis about up to 5% of fume silica.

17. A medium weight castable composition to be used as a refractory where abrasive wear is encountered comprising a solids blend on a weight percentage basis of:

about 30 to 50% of a synthetic cordierite containing material having a grain size of about 6×20 Tyler mesh;

about 14 to 34% of a material having both a higher thermal conductivity and hardness than the synthetic cordierite containing material and being selected from the group consisting of calcined kaolin, calcined flint, fused silica, or a combination thereof and having a grain size of less than 20 Tyler mesh;

about 0 to 6% of fly ash cenospheres;

about 0 to 5% of an air floated clay;

about 0 to 5% of a fume silica; and about 20 to 35% of a cement binder.

18. The castable according to claim 17 wherein said binder is a calcium aluminate cement.

19. A medium weight castable composition to be used as a refractory where abrasive wear is encountered comprising a solids blend on a weight percentage basis of:

about 30 to 50% of a relatively coarse grained synthetic cordierite containing material having a grain size of about 6–20M;

about 8 to 21% of a relatively fine grained material having both a higher thermal conductivity and hardness than the synthetic cordierite containing material selected from the group consisting of calcined kaolin, calcined flint, fused silica, or a combination thereof and having a grain size which passes through about 20 Tyler mesh;

about 6 to 13% of a relatively fine grained material having both a higher thermal conductivity and hardness than the synthetic cordierite containing material selected from the group consisting of calcined kaolin, calcined flint, fused silica, or a combination thereof and having a grain size which passes through about 100 Tyler mesh;

about 0 to 6% of fly ash cenospheres having a grain size of about 48–400 Tyler mesh;

about 0 to 5% of air floated clay;

about 0 to 5% of fume silica; and about 20 to 35% of a cement binder.

20. The castable according to claim 19 wherein said binder is a calcium aluminate cement.

21. The composition according to claims 9, 10, 11 or 12 in which the composition has a bulk density of no greater than about 130 lbs/cu ft after being dried at about 220° F.; a cold crushing strength of at least about 3000 PSI at 1,500° F., a modulus of rupture at 1,500° F. of at least about 700 PSI, a linear charge of between about 0.5% and about −0.5% at 1500° F., an abrasion loss of no greater than about 25 cc after being fired at about 1,500° F., and a thermal conductivity of no greater than about 5.5 BTU/hr/ft$^2$/in/°F. at a mean temperature of about 1000° F.

* * * * *